United States Patent [19]
Montgomery et al.

[11] Patent Number: 5,318,806
[45] Date of Patent: Jun. 7, 1994

[54] TUBE HAVING REGIONS OF DIFFERENT SURFACE CHEMISTRY AND METHOD THEREFOR

[75] Inventors: David B. Montgomery, Cary; Erwin A. Vogler, Newhill, both of N.C.

[73] Assignee: Becton, Dickinson and Company, Franklin Lakes, N.J.

[21] Appl. No.: 955,964

[22] Filed: Oct. 2, 1992

[51] Int. Cl.$^5$ .......................... B05D 1/04; B05D 5/00
[52] U.S. Cl. .................................. 427/491; 427/488; 427/562; 427/569; 427/577
[58] Field of Search .................... 422/102, 906, 907; 118/715, 716; 204/192.15; 427/249, 569, 577, 488, 489, 490, 491, 579, 574, 562, 563, 564, 238

[56] References Cited
U.S. PATENT DOCUMENTS
4,673,586  6/1987  White .................................. 427/562
4,967,763 11/1990  Nugent et al. ...................... 128/763
5,227,202  7/1993  Thiebaud et al. ................... 427/488

OTHER PUBLICATIONS
Pitt, W. G. "Fabrication of a continuous wettability gradient . . . " *J. Colloid Interface Science* 133(1), 223–7, 1989.
Golander et al., Biomaterials 11,32 (1990).
Elwing et al., Advances in Colloid and Interface Science, 32,317 (1990).

Primary Examiner—Robert J. Warden
Assistant Examiner—Robert Carpenter
Attorney, Agent, or Firm—Richard E. Brown

[57] ABSTRACT

In a method to modify the chemistry of a portion of the surface of an article, the surface is placed adjacent an electrode in a plasma chamber, the distance to the wall of the chamber being at least five times the size of the electrode. A plasma of very high power density is generated in a discharge volume surrounding the electrode so that the surface area closest to the electrode receives a very intense plasma which diminishes with increasing distance from the discharge volume thus forming a chemical gradient on the article surface. The preferred article is a tube having one closed end, and the gradient may be formed from either the closed end or the open end. The gradient may be of decreasing glass-like character or decreasing plastic like character.

13 Claims, 7 Drawing Sheets

TUBE HAVING REGIONS OF DIFFERENT SURFACE CHEMISTRY AND METHOD THEREFOR

BACKGROUND OF INVENTION

1. Field of the Invention

This invention relates to medical devices and more particularly relates to a process for modifying the chemistry of a particular region of the surface of the device.

2. Background

Blood samples are routinely taken in evacuated tubes, such as glass VACUTAINER ™ tubes (Becton Dickinson and Company). One end of a double-ended needle is inserted into a patient's vein. The other end of the needle then punctures a septum covering the open end of the VACUTAINER ™ tube so that the vacuum in the tube draws the blood sample through the needle into the tube. Using this technique a plurality of samples can be taken using a single needle puncture of the skin.

Plastic tubes have also been proposed for blood collection. Plastic offers a number of advantages such as lower breakage than glass tubes, less weight in shipment, and easier disposal by incineration.

During sample collection, the blood comes into contact with the interior surface of the collection tube. The nature of the blood surface interaction is complex. For example, the blood clotting cascade is activated by contact of the blood with a wettable glass surface and the formed clot does not adhere to the glass, making it easy to separate clot from blood plasma by centrifugation. However, because the clot is non adherent, it is subject to resuspension in part or whole into the plasma layer during handling or transportation. Thus, in glass tubes, the same surface properties that lead to easy separation of clot from the serum also allow the clot to move freely in the tube.

Plastic tubes generally have a nonwettable surface and do not activate the clotting process efficiently. Clots formed in these tubes may be quite gelatinous relative to those in glass. These gelatinous clots adhere tenaciously to plastic surfaces and do not allow for clean separation of serum from clot in conventional hematological centrifuges. However, the adherent clot is not easily disrupted by ordinary handling procedures. Thus, although plastic surfaces do not cleanly separate serum from clot, the adhesion of the clot to the plastic surface and its mechanical stability is a positive feature not available in glass tubes.

Thus, the ideal blood collection tube for serum separation would exhibit both glass-like and plastic like surface activity. In the present disclosure, the term glass-like is used to describe a surface which is substantially wettable by aqueous liquids, which initiates clot formation and which is non-adherent to the formed clot. The term plastic-like is used to describe a surface which is substantially nonwettable by aqueous liquids, which does not initiate clot formation to any significant degree, but which is highly adherent to clot material.

Various methods have been proposed for modification of glass and plastic surfaces. In one method, plastic surfaces are coated with a detergent material to render them more glass-like. This approach has the disadvantage of adding a soluble foreign material which contaminates the serum and may interfere with subsequent blood analysis. Another approach has been to treat surfaces with a gas plasma to modify either the hydrophilic or hydrophobic character of the surfaces. In these approaches, the entire interior surface of the tube is substantially modified to interconvert glass-like and plastic-like surfaces.

Formation of a hydrophobicity gradient on a polydimethylsiloxane film is taught by Golander et al. in *Biomaterials* 11,32 (1990). The film surface is exposed to an oxygen plasma generated in a planar diode system for various lengths of time as regulated by a cover movably positioned between the plasma and the polymeric surface.

Wettability gradients are formed on silicon plates by Elwing et al. in *Advances in Colloid and Interface Science*, 32,317 (1990). The gradients are formed by diffusion-induced silylation using dichlorodimethyl silane.

There is need in the art of blood collection for a tube which promotes clot formation, permits clean separation of clot from serum and enhances strong adherence of the formed clot to minimize mechanical remixing of clot material with serum.

SUMMARY OF THE INVENTION

A method for modifying the chemistry of the surface of an article includes positioning the surface to be modified adjacent an electrode in a plasma chamber, the distance from the electrode to the wall of the chamber being at least five times the largest electrode dimension. The chamber is evacuated and a process gas is introduced at a reduced pressure. Radio frequency (RF) power of high intensity is applied to the electrode to ionize the gas and form a plasma. Because the power is high, the electrode is small and the distance to the wall is large relative to the electrode size, the plasma is formed in a limited volume near the electrode, hereinafter the discharge volume. A relatively high power density is thereby achieved. In the present disclosure the term power density defines the relationship between net power delivered to the plasma and the discharge volume, and is expressed as power per unit discharge volume.

The plasma modifies the surface chemistry of the article with decreasing intensity with increasing distance from the electrode to give a surface chemistry gradient. The gradient can be sharp, giving a first surface area of one chemistry contiguous with a second surface area of another chemistry. Alternatively, a diffuse gradient from the most-modified surface area to unchanged surface area can be achieved.

Another aspect of the invention is an article having a surface which has been modified by the method of the invention, such as a film, disc, flask, vial, dish or bottle. The method is preferably applied to an article having one closed end, most preferably to a tube.

The invention may be applied to either the open end or the closed end of the article by placing the end of the article to be treated most intensely adjacent the discharge volume. For the embodiment of the invention wherein the mouth of the article is to be treated most intensely, the article preferably is plastic and the process gas is a hydrophilic gas. For the embodiment of the invention wherein the closed end of the tube is to be treated most intensely, the article preferably is glass and the process gas is hydrophobic. In the present disclosure a hydrophilic gas is one which renders the surface more glass-like and a hydrophobic gas is one which renders the surface more plastic-like wherein glass-like and plastic-like surfaces are substantially wettable and substantially nonwettable respectively.

When the closed end of the article is to receive the most intense plasma, the method preferably includes encasing the electrode and the article in a dielectric and placing a discharge limiting element inside the article.

Thus the invention provides a gradient surface by a simple, rapid and inexpensive method using conventional plasma generating equipment applicable to high volume manufacturing. The chemistry gradient can be manipulated to be sharp or diffuse by judicious choice of plasma parameters and sample placement relative to the electrode and the chamber wall. The method is of particular value in providing a blood collection tube having a glass-like surface near the tube mouth to enhance the clotting sequence without clot adherence and a plastic-like surface in the area near the closed end to enhance adherence of the clot at the bottom of the tube during centrifugation.

DETAILED DESCRIPTION

Figure 1:
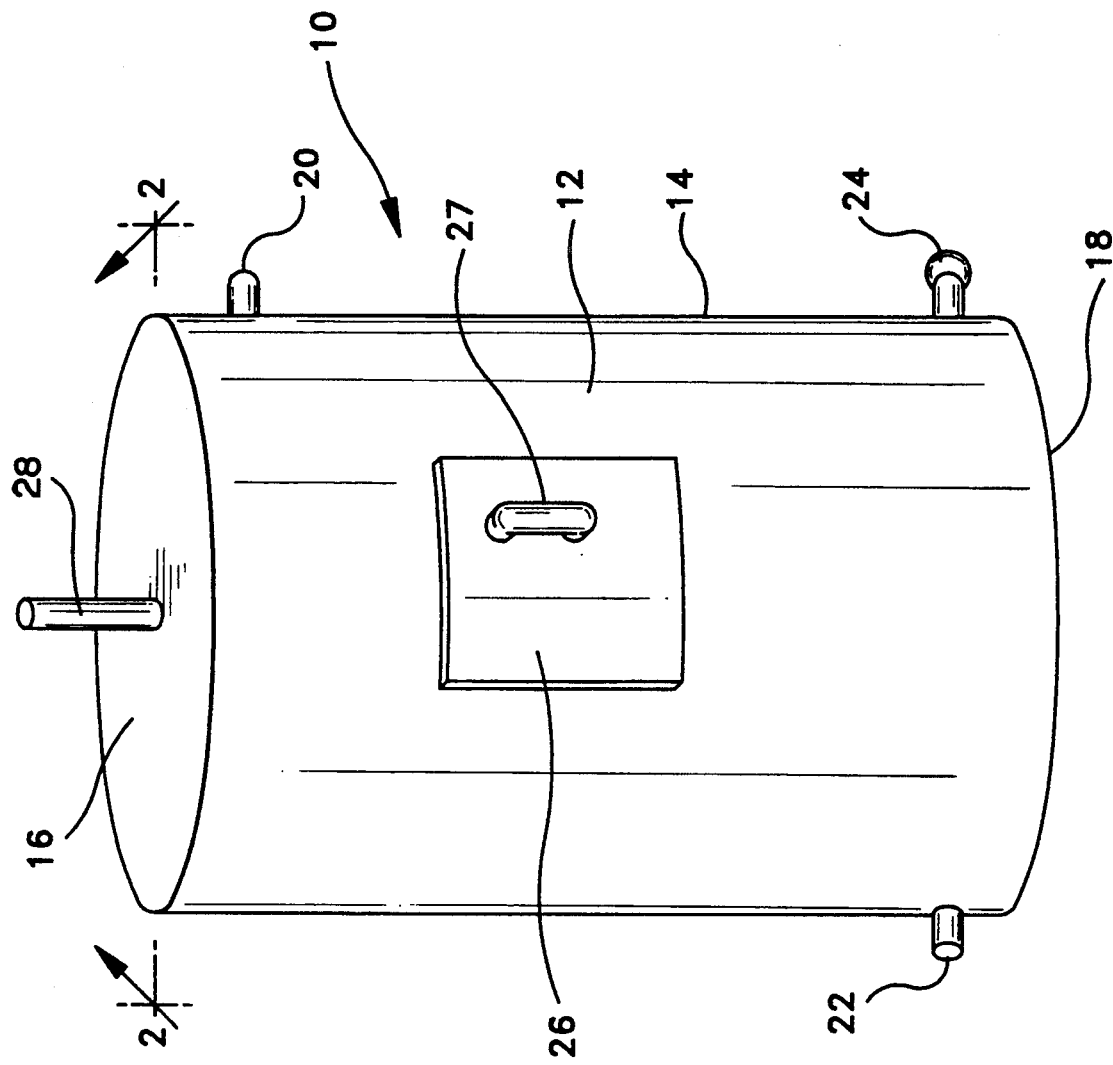
FIG. 1 is a perspective view of a typical plasma treatment apparatus of the invention.

While this invention is satisfied by embodiments in many different forms, there will herein be described in detail preferred embodiments of the invention, with the understanding that the present disclosure is to be considered as exemplary of the principles of the invention and is not intended to limit the invention to the embodiments described and illustrated. The scope of the invention will be measured by the appended claims and their equivalents.

In accordance with the present invention, gradient surfaces are achieved by forming an intense and localized gas plasma adjacent to the surface to be modified. The invention contemplates forming a gradient surface on a variety of glass or plastic articles, such as films, plates, flasks, bottles, vials and dishes. The preferred article geometry is a tube with one closed end, most preferably a plastic tube. The invention will be described in detail for a tube with the understanding that any other article can be treated if its surface can be positioned adjacent the localized plasma.

The tube may be combined with a septum over the open end and may be evacuated. Evacuated tubes for blood collection are standard in the art, as, for example, VACUTAINER TM brand tubes (Becton, Dickinson and Company).

When the tube is glass, it is preferred to introduce a plastic-like surface gradient to a portion of the inside wall of the tube. When the tube is plastic, it is preferred to introduce a glass-like surface gradient to a portion of the inside wall of the tube.

Conventional plasma generating systems fall within one of four general types, known in the art as planar diode systems, barrel plasma reacting systems, external capacitively coupled systems and inductively coupled systems. Plasma generating units of each type are commercially available wherein, active species diffuse rapidly and fill substantially all of the volume within the vacuum chamber with ionized and excited species. Thus in conventional plasma systems, the discharge volume (the volume occupied by active species) and the chamber volume are about the same. Uniform surface modification of materials in the chamber takes place regardless of where the materials are placed in the chamber.

Conventional uniform plasmas used for surface modification are formed using plasma parameters varied over a wide range. Thus conventional ranges for power, RF frequency, duration of exposure, temperature, gas pressure and gas flow rate are about 10 to 1000 watts at an RF frequency of about 0.05 to 50 megahertz, 0.001 to 1 hour, 0° to 200° C., 0.1 to 10 Torr and 1 to 200 cubic centimeters per minute. Operating within these ranges with conventional plasma chambers and electrodes results in a power density of about 0.001 to 0.1 watts per cubic centimeter of discharge volume.

In accordance with the present invention, an intense plasma can be localized in a discharge volume around the active electrode by operating within a particular combination of gas pressure, RF power level, electrode dimension and distance to the chamber wall.

The gas pressure may be from about 0.5 to 20 preferably about 1 to 10, most preferably about 2 to 5 Torr. The RF power may be from about 5 to 100, preferably about 10 to 50 watts at a frequency of about 1 to 50, preferably about 5 to 30 megahertz. RF power may be applied to an active electrode in the shape of a pad, rod or preferably a wire point having a surface area of about 0.001 to 1.0 square cm, most preferably having no dimension larger than about 1 cm. The above plasma parameters provide a power density of about 1 to 50 watts per cubic centimeter.

It has now been found that surface modification gradients can be achieved by localizing the plasma about an active electrode which is dimensionally small relative to the distance to the chamber wall. Thus the ratio of greatest electrode dimension to the distance to the chamber wall is about 1:5 to 1:100 preferably about 1:10 to 1:20 . Using a ratio of electrode dimension and distance to the chamber wall which falls within these limits and the aforementioned power density, one skilled in the art may easily determine a gas pressure and RF power setting which provide an intense plasma surrounding the electrode which has a discharge volume radius up to about 10 times, preferably about twice the largest electrode dimension.

The above discussion of suitable plasma generating systems for production of surface gradients will now be further described with the aid of the drawings.

FIG. 1 shows a typical plasma generator 10 of the invention. A cylindrical canister 12 has a side wall 14, topwall 16 and bottom wall 18. A gas inlet 20, outlet 22 and pressure gauge 24 extend outwardly from side wall 14. Sidewall 14 has a door 26 with handle 27 to provide access to the interior of canister 12, and a coaxial cable 28 is connected to an external source of RF power (not shown).

Figure 2:
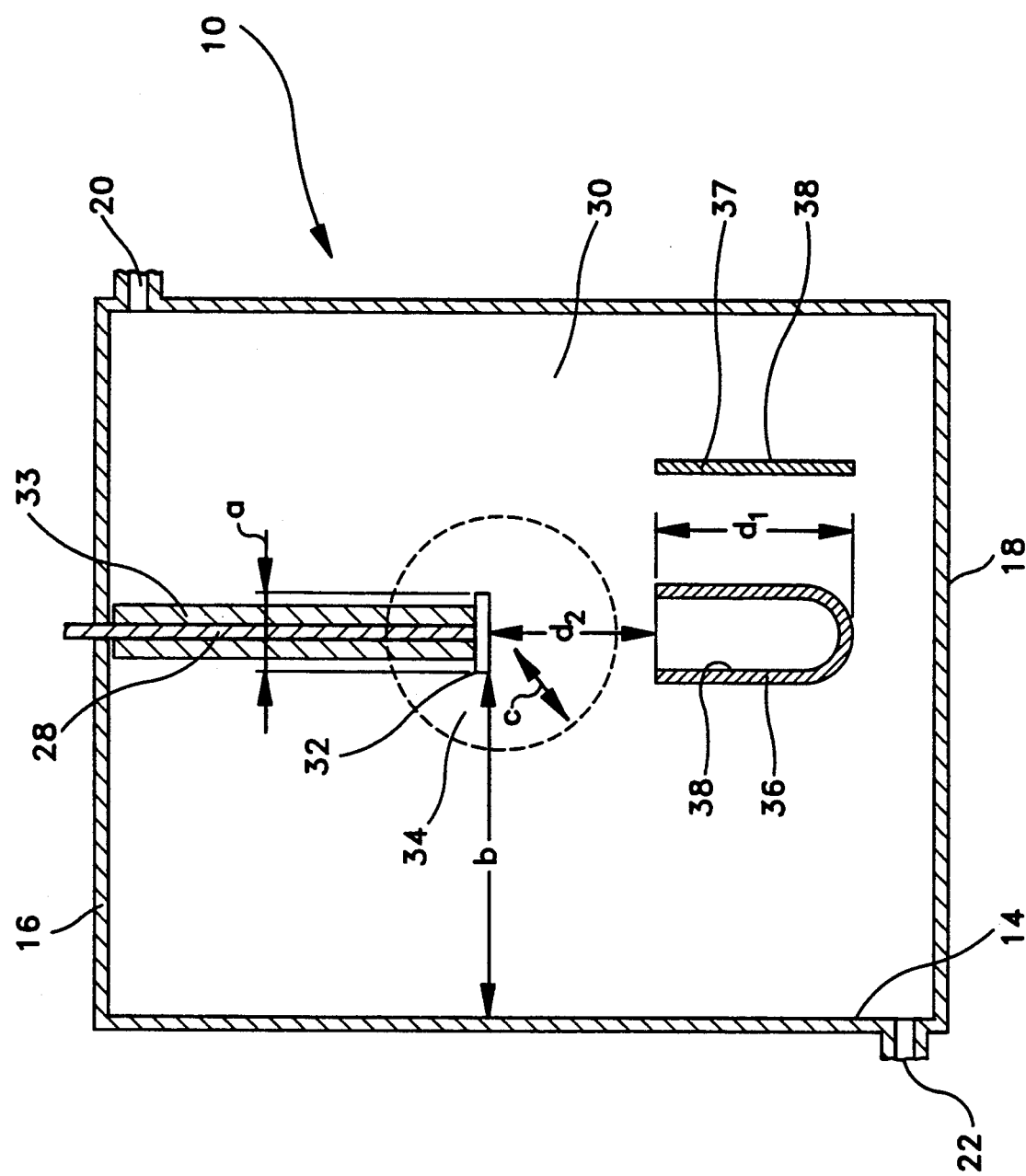
FIGS. 2 and 3 are vertical sectional views of the apparatus of FIG. 1 taken along the line 2—2 thereof showing top down and bottom up tube treatments respectively.

FIG. 2 illustrates the plasma generating system 10 of FIG. 1 suitable for formation of plasma gradients on the inside wall surface of an article. In FIG. 2, an internal plasma chamber 30 is defined by canister side, top and bottom walls 14, 16 and 18 respectively. Coaxial cable 28 is connected to a source of RF power (not shown)

and to an electrode 32, shown in FIG. 2 as a pad. Preferably, cable 28 is covered by an insulating shield, 33, which may be of any size, preferably about 2 cm. in diameter. The largest dimension of the electrode is shown as dimension a and the distance to the chamber side wall 14 is shown as dimension b wherein b is at least 5 times greater than a. When chamber 30 contains a process gas at a suitable pressure and RF power is turned on, a plasma discharge 34 is formed and localized about electrode 32. With the exposed (nonshielded) electrode of FIG. 2, a preferred power density of about 1 to 10 watts per cc may be used. While the shape of the discharge will approximate the shape of the electrode, for the small electrodes contemplated by the present invention, it is substantially spherical. The radius of discharge 34 is shown by dimension c, and may be from about 2 to 25 mm, preferably about 4 to 15 mm. It is understood that plasma discharge 34, while shown in the drawings to have a sharp boundary, actually has a diffuse boundary which decreases in intensity with increasing distance from the electrode.

An article to be surface modified, such as a tube 36 or a film 37, both having a wall surface 38 of length $d_1$, may be placed adjacent to or just inside or outside of discharge 34 at a distance $d_2$ from electrode 32. Distance $d_2$ may be from about 0.1 to 2.0 times the value of distance c. The ratio of length $d_1$ to distance c may be about 2 to 20, preferably about 3 to 10. Because of the diffuse boundary of discharge 34, the plasma and therefore modification of surface 38 decreases with increasing distance $d_2$.

In another embodiment of the invention, a gradient may be applied to the inside wall surface of the closed end of a tube. For this embodiment of the invention, a suitable plasma may be generated with the system illustrated in FIG. 3. (In FIG. 3, corresponding elements are given the same reference numeral as in FIG. 2 with a letter suffix).

Figure 3:
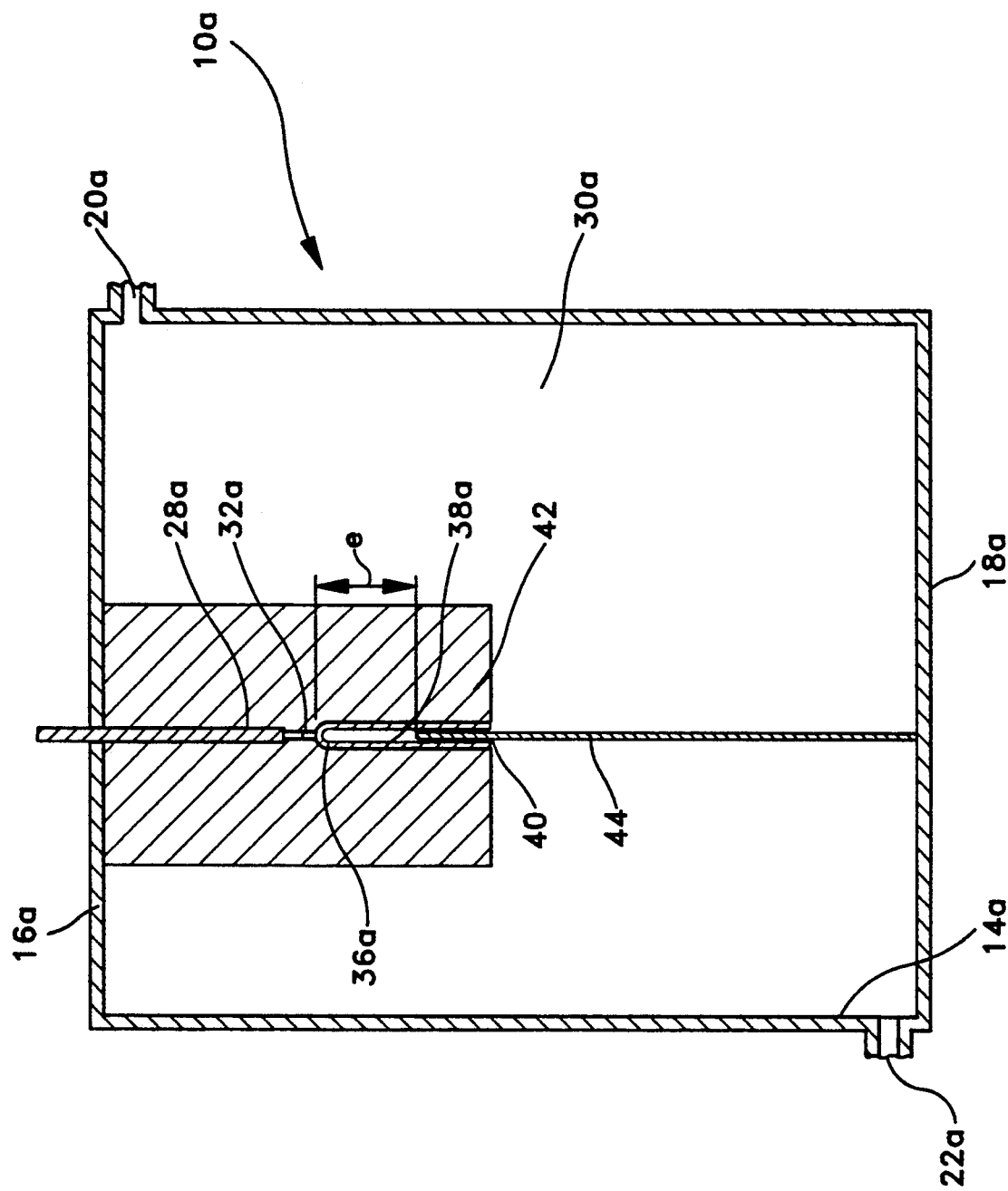

In FIG. 3, coaxial cable 28a is connected to active electrode 32a, shown as a wire. Tube 36a fits snugly in a recess 40 machined out of a block of dielectric material 42 and is positioned adjacent to and preferably touching electrode 32a. Cable 28a and electrode 32a are also surrounded by dielectric shield 42 which prevents dissipation of the power due to formation of plasma external of the tube. Preferably, a discharge limiting element 44 of any conducting material may be positioned inside of tube 36a to limit diffusion of charged species inside the tube and thereby help control the length of the gradient. In FIG. 3, the distance between the electrode tip and the top of the discharge limiting element 44 is distance e. For example, if it is desired to create a gradient near the tube bottom, element 44 may be placed about 1 cm. from the tube bottom.

When the chamber contains a process gas at the desired pressure and power is applied to the active electrode 32a, an intense plasma is developed in the tube at its closed end. The charged species travel down the tube with decreasing energy until reaching element 44 which absorbs a portion of the energy of the active particles and limits the length of the gradient. Element 44 may be placed anywhere in the tube and may have different shapes to focus the plasma in such a way to produce gradients ranging from sharp to diffuse areas between the treated and untreated portions of the tube surface. Thus, element 44 may vary from a needlelike wire to a cylindrical or conical rod nearly equal in size to the inside diameter of the tube, and may have any tip shape desired. As seen in FIG. 3, element 44 is preferably shorted directly to a wall of the metal canister.

When applying a gradient using a shielded electrode as in FIG. 3, it is preferred to use a power density of 5–50 watts per cubic centimeter.

Plasma generating systems which include a metal canister, vacuum producing system, gas inlet, outlet and pressure regulator, high frequency generator and impedance matching network are conventional in the art.

The plastic tube of the invention may be of any suitable polymer, for example polyethylene terephthalate (PET), polyethylene, polypropylene, polyurethane, acrylic, and polytetrafluoroethylene, preferably polystyrene (PS).

The tube of the invention may be any shape, preferably cylindrical and may be about 25 to 250, preferably about 50 to 100 mm long and 8 to 20 mm in diameter. The tube or other article may be supported by any suitable means within the chamber of the plasma generator. The plasma discharge may be a pulsed audio frequency, or preferably an RF discharge. Most preferably, an intermittent RF glow discharge is used wherein the RF power is alternately on and off.

Having now described the apparatus and conditions for plasma treatment of a tube, it will be apparent to one of ordinary skill in the art that any of the aforementioned article geometries may be substituted for the tube and receive a surface gradient.

The process gas chosen for generation of the plasma of the invention depends on the surface chemistry desired. If it is desired to introduce a plastic-like gradient surface, suitable plasma gases are fluorine, hydrogen, hexafluoroethane, chlorofluorocarbons and hydrocarbons such as methane and hexane. However, since most polymeric surfaces are substantially plastic-like to begin with, a more preferred embodiment of the invention introduces a glass-like gradient surface to the plastic tube which decreases with increasing distance from the active electrode. For imparting a glass-like surface, suitable plasma gases are ammonia, sulfur dioxide, carbon dioxide, air, and preferably oxygen. The preferred embodiment of the invention is a PS tube modified by an oxygen plasma generated at the mouth of the tube in accordance with FIG. 2 so that the surface is most glass-like at the mouth. However, as illustrated in FIG. 3, the plasma can be generated through the bottom of the tube so that the surface is most glass-like at the tube bottom.

The length of the plasma treatment may be about 5 to 100 seconds, applied either continuously or preferably intermittently. When the plasma is generated by intermittent field emission, heat buildup and possible thermal damage to the plastic is avoided.

The active electrode and the discharge limiting element may be of any conducting material, preferably copper, stainless steel or aluminum. The dielectric may be glass or high molecular weight polyethylene of any thickness which prevents any substantial ionization of gases outside of the tube.

Figure 4:
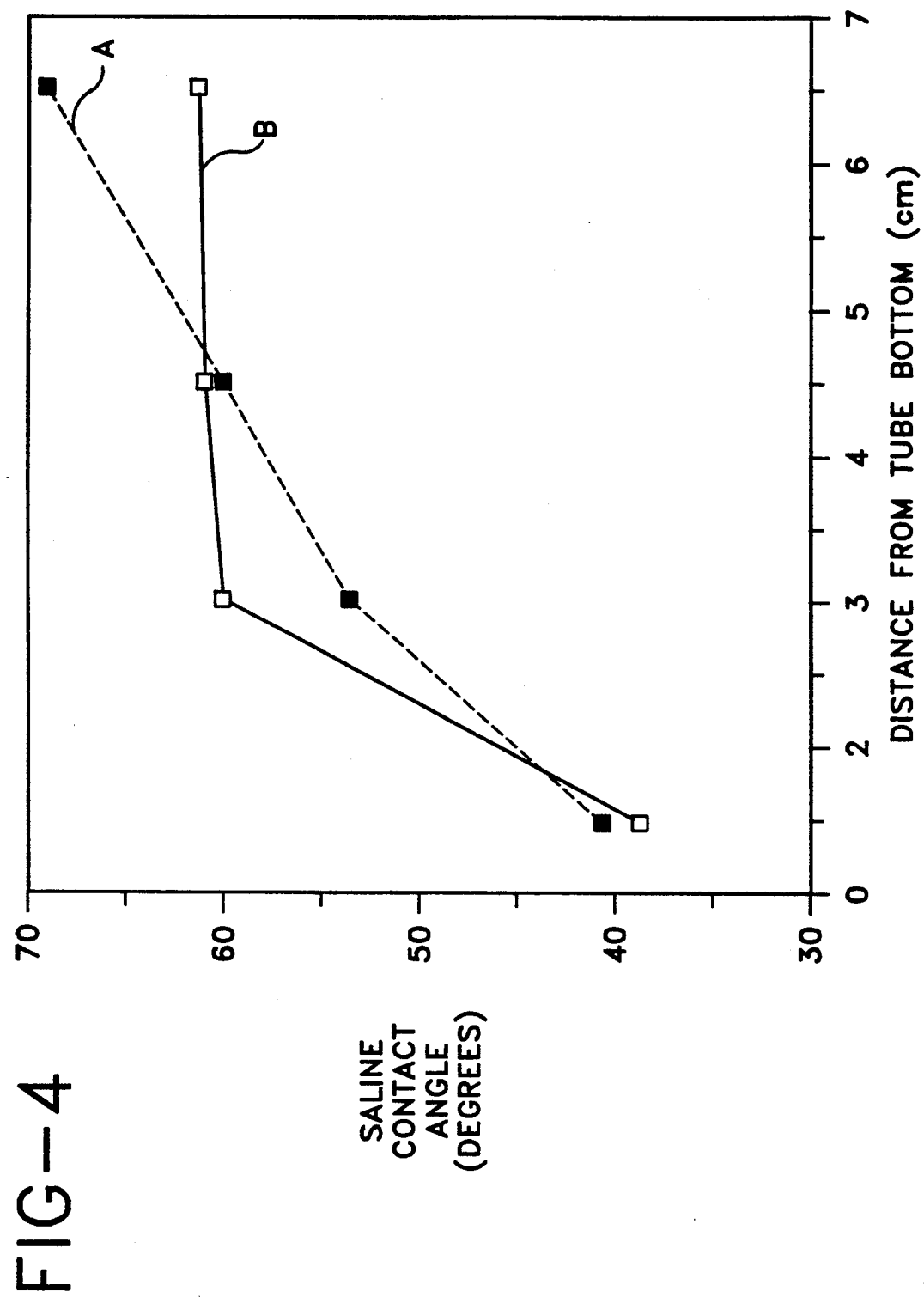
FIGS. 4–6 are plots showing gradients resulting from plasma treatment of a plastic tube by the method of the invention.
Figure 5:
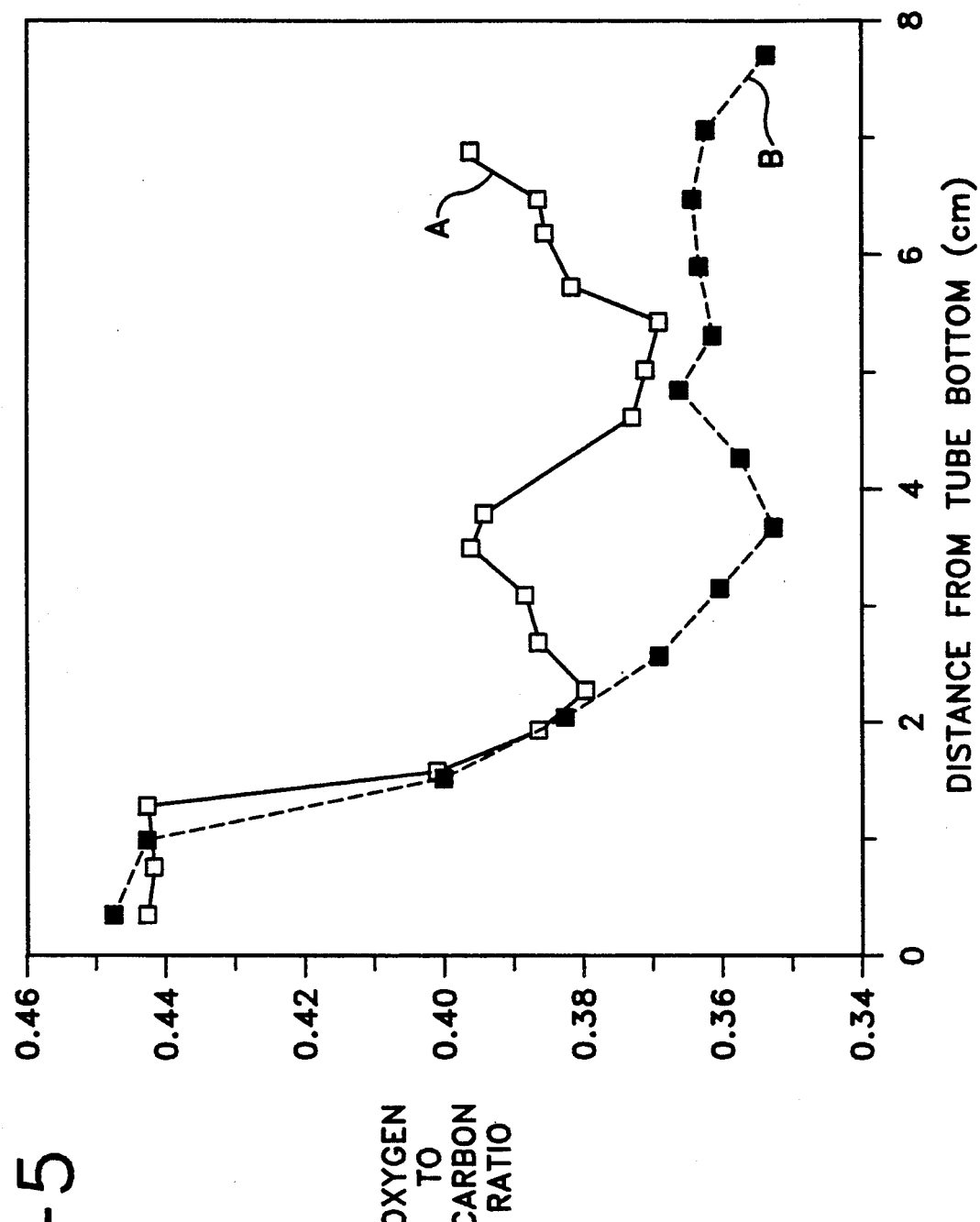
Figure 6:
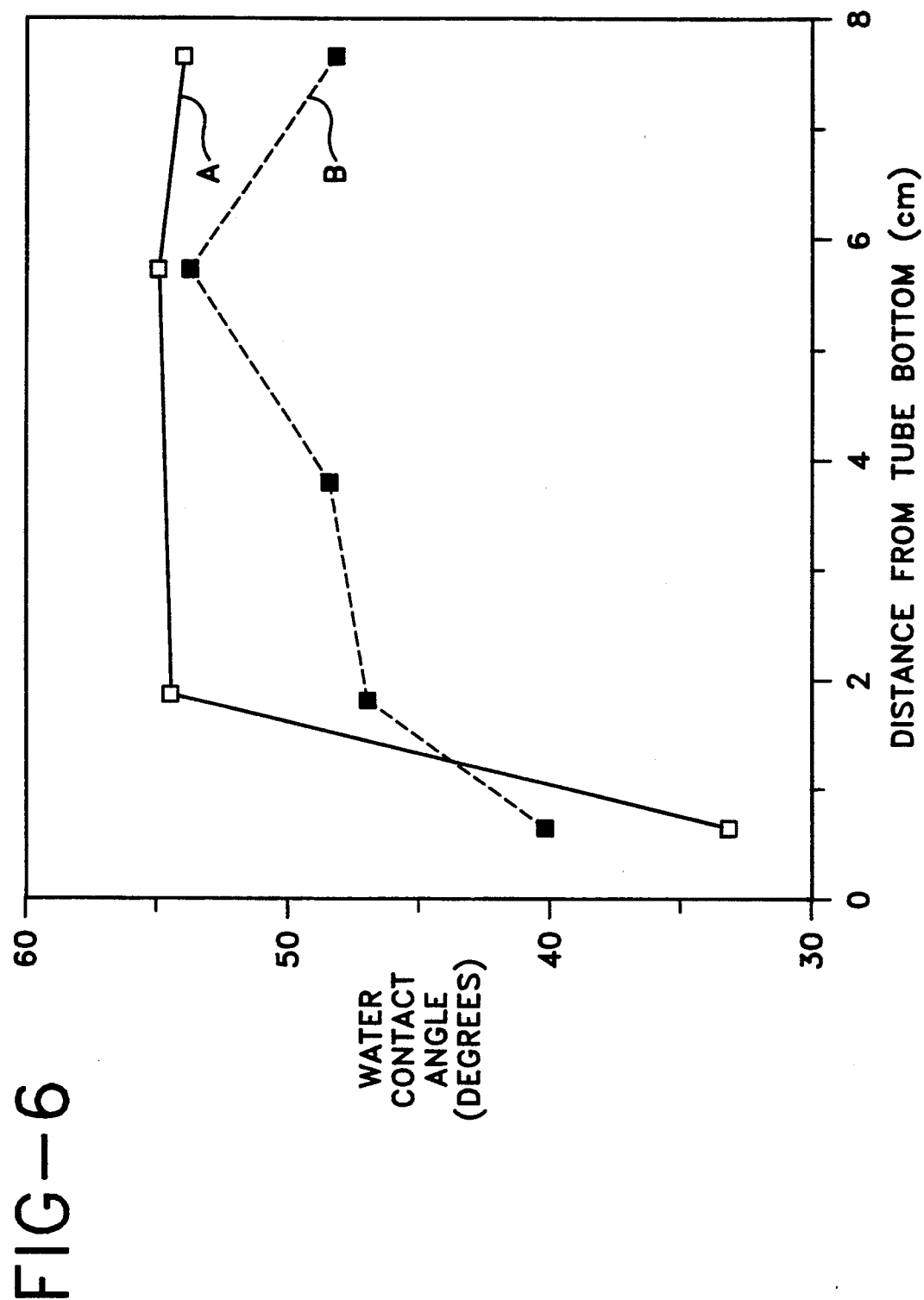

The glass-like or plastic-like nature of the gradient surfaces prepared by the method of the invention may be determined by conventional wettability and surface carbon to oxygen ratio. Wettability may be expressed as water or saline receding contact angles by standard techniques well known to those skilled in the art. Oxygen to carbon ratios may be determined by conventional ESCA analysis at various points along the gradient surface. FIGS. 4 to 6 illustrate wettability and ESCA data for PET tubes treated with oxygen plasma by the method of the invention.

Curves A and B of FIG. 4 are plots of contact angle against distance from the bottom of a PET tube showing the change in gradient shape using conical (Curve A) and cylindrical (Curve B) discharge limiting elements respectively. Curve A showing a diffuse gradient and Curve B showing a sharp gradient correspond to experiments 5 and 6 of the Tables respectively.

FIG. 5 illustrates the effect of a wire discharge limiting element on the shape of gradients in a PET tube using oxygen pressures of 1.0 Torr (Curve A) and 3.0 Torr (Curve B) respectively, as determined by ESCA analysis. Curve C is an untreated control tube. FIG. 6 illustrates the same effect as FIG. 5 as determined by contact angle measurements. FIGS. 5 and 6 correspond to experiments 7 and 8 in the Tables respectively.

Figure 7:
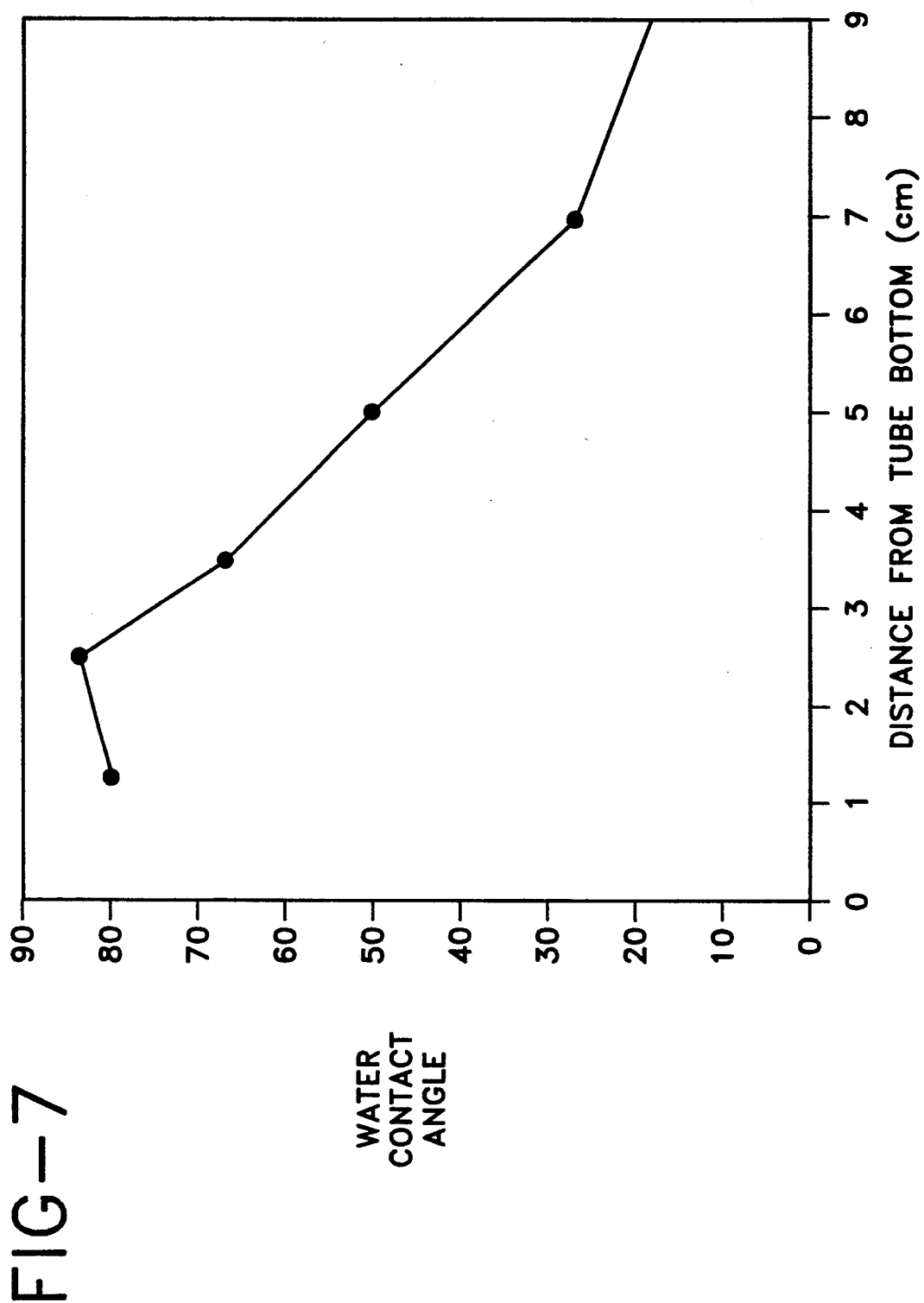
FIG. 7 is a plot showing a gradient resulting from plasma treatment of a glass tube by the method of the invention.

FIG. 7 shows the gradient obtained from experiment 11 of the Tables. In this experiment a 16 by 100 mm glass tube was subjected to a 30 sec. hexane plasma, using a 0.32 cm wire discharge limiting element, and the gradient was determined by measuring the contact angle at increasing distances from the tube bottom. A gradual increase in glass-like surface character starting about 2 cm from the bottom of the tube is seen.

Tables I and II provide experimental details of representative surface gradients introduced to articles by the plasma process of the invention. Table I describes the apparatus used and Table II provides plasma parameters and surface gradient results.

TABLE I

| EXAMPLE | ARTICLE | SYSTEM (Fig.) | DISCHARGE LIMITING ELEMENT | DIMENSIONS (cm) | | | | |
|---|---|---|---|---|---|---|---|---|
| | | | | a | b | $d_1$ | $d_2$ | e |
| 1 | PS tube | 2 | | 1.4 | 15 | 7.5 | 0.7 | 2 |
| 2 | PS tube | 3 | wire | | | | | 3.2 |
| 3 | PS film | 2 | | 1 | 15 | 10 | 0.5 | |
| 4 | PS film | 2 | | 1 | 15 | 10 | 0.5 | |
| 5 | PET tube | 3 | cone | | | | | 2 |
| 6 | PET tube | 3 | cylinder | | | | | 2 |
| 7 | PET tube | 3 | wire | | | | | 2 |
| 8 | PET tube | 3 | wire | | | | | 2 |
| 9 | PS tube | 2 | | 1.4 | 15 | 7.5 | 1.0 | |
| 10 | glass tube | 2 | | 1.4 | 15 | 10 | 2.0 | |
| 11 | glass tube | 3 | wire | | | | | 2 |

TABLE II

| EXAMPLE | GAS/PRESSURE (Torr) | TIME (sec) | POWER DENSITY (watts/cc) | GRADIENT RANGE (cm from electrode) |
|---|---|---|---|---|
| 1 | oxygen/3 | 35 | ~2 | 2 to 6 |
| 2 | oxygen/3 | 35 | ~10 | 4 to 7.5 |
| 3 | oxygen/1 | 10 | ~4 | 5 to 10 |
| 4 | oxygen/3 | 10 | ~4 | 2.5 to 10 |
| 5 | oxygen/3 | 10 | ~10 | FIG. 4 |
| 6 | oxygen/3 | 10 | ~10 | FIG. 4 |
| 7 | oxygen/1 | 10 | ~10 | FIGS. 5,6 |
| 8 | oxygen/3 | 10 | ~10 | FIGS. 5,6 |
| 9 | $SO_2$/1.2 | 30 | ~2 | 2.3 to 8.5 |
| 10 | hexane/0.5 | 60 | ~5 | 2 to 6 |
| 11 | hexane/0.9 | 30 | ~5 | FIG. 7 |

What is claimed is:

1. A method for modifying a portion of an article surface comprising:
   a) positioning an article having a surface adjacent an electrode in a plasma chamber having a chamber wall, said chamber containing a process gas, the ratio of the largest electrode dimension to the shortest distance from the electrode to the chamber wall being no more than 1.5; and
   b) delivering radio frequency power to said electrode whereby said process gas in a discharge volume surrounding said electrode is ionized to give a plasma, said discharge volume being smaller than the volume of said plasma chamber, said article being positioned from said electrode a distance about 0.1 to 2.0 times the radius of said discharge volume, said plasma modifying a portion of said article surface.

2. A method for modifying an article surface comprising:
   a) positioning an article having a surface adjacent an electrode in a plasma chamber having a chamber wall, the ratio of the largest electrode dimension to the shortest distance from the electrode to the chamber wall being no more than 1:5;
   b) evacuating said chamber;
   c) bleeding a process gas into the evacuated chamber; and
   d) delivering radio frequency power to said electrode whereby said process gas in a discharge volume surrounding said electrode is ionized to give a plasma, said discharge volume being smaller than the volume of said plasma chamber, said article being positioned from said electrode a distance about 0.1 to 2.0 times the radius of said discharge volume, said plasma modifying said surface to include a gradient between a glass-like first area and a plastic-like second area.

3. The method of claim 2 wherein said article is plastic.

4. The method of claim 3 wherein said plastic is selected from the group consisting of polystyrene, polyethylene, polypropylene, polyethylene terephthalate, polyurethane, acrylic, polyvinyl chloride and polytetrafluoroethylene.

5. The method of claim 3 wherein said process as is a hydrophilic gas.

6. The method of claim 5 wherein said hydrophilic gas is selected from the group consisting of air, oxygen, nitrogen, carbon dioxide and sulfur dioxide.

7. The method of claim 5 wherein said plastic-like second area is the plastic surface unmodified by said plasma.

8. The method of claim 2 wherein said article is glass.

9. The method of claim 8 wherein said process gas is a hydrophobic gas.

10. The method of claim 9 wherein said hydrophobic gas is selected from the group consisting of hydrogen, fluorine, methane, hexane and hexafluoroethane.

11. The method of claim 9 wherein said glass-like first area is the glass surface unmodified by said plasma.

12. A method for modifying the inside wall surface of a plastic tube comprising:
   a) positioning a plastic tube having an open end, a closed end and an inside wall surface so that said open end is adjacent an electrode in a plasma chamber having a chamber wall, the ratio of the largest electrode dimension to the shortest distance from the electrode to the chamber wall being no more than 1:5; and
   b) evacuating said chamber;
   c) bleeding oxygen into the evacuated chamber; and
   d) delivering radio frequency power to said electrode whereby a plasma is generated in a discharge volume surrounding said electrode, said discharge volume being smaller than the volume of said plasma chamber, said plasma modifying said inside wall surface to be glass-like at said open end and to include a gradient of decreasing glass-like character with increasing distance down said inside wall surface from said open end.

13. A method for modifying the inside wall surface of a glass tube comprising:
 a) positioning a glass tube having a closed end, an open end and an inside wall surface so that said closed end is adjacent an electrode in a plasma chamber having a chamber wall, the ratio of the largest electrode dimension to the shortest distance from the electrode to the chamber wall being no more than 1:5, said tube and electrode being encased in a dielectric;
 b) inserting a discharge limiting element into said open end;
 c) evacuating said chamber;
 d) bleeding hexane into the evacuated chamber; and
 e) delivering radio frequency power to said electrode whereby a plasma is generated in a discharge volume surrounding said electrode, said discharge volume being smaller than the volume of said plasma chamber, said plasma modifying said inside wall surface to be plastic-like at said closed end and to include a gradient of decreasing plastic-like character with increasing distance from said closed end.

* * * * *